Jan. 8, 1952 — H. H. DEIST ET AL — 2,581,939

MOLD FOR ELECTRONIC VULCANIZATION

Filed July 5, 1947

INVENTORS
HERBERT DEIST
AND
FRED H. MASON

BY
ATTORNEYS.

Patented Jan. 8, 1952

2,581,939

UNITED STATES PATENT OFFICE 2,581,939

MOLD FOR ELECTRONIC VULCANIZATION

Herbert Henry Deist and Fred H. Mason, Akron, Ohio, assignors to The Firestone Tire & Rubber Company, Akron, Ohio, a corporation of Ohio Application July 5, 1947, Serial No. 759,048

3 Claims. (Cl. 18—47)

This invention relates to molds for the vulcanization of products composed of rubber or rubber-like composition or other thermo-setting plastics and more especially it relates to molds employed in electronic vulcanization.

The molds used for electronic vulcanization must be composed substantially of dielectric material; hence they may be, and frequently are, composed entirely of wood. However, such molds are used only when the product to be vulcanized is of relatively simple design. When the product is of complex configuration, such as a vehicle tire having traction elements formed in relief on the periphery of tread portion thereof, the engraving of a molding cavity in the wooden structure is so laborious and time consuming as to be economically impractical. It is to the relief of this condition that this invention primarily is directed.

The chief objects of the invention are to provide an improved mold for the electronic treatment of thermo-setting plastics; to provide a mold of the character mentioned adapted for the molding of products of complex design; to provide a mold wherein the complex molding elements readily may be removed and others substituted therefor; to provide a mold of the character mentioned of sufficient strength to withstand the pressure of a conventional platen press; and to provide in an improved manner for the venting of the mold. Other objects will be manifest as the description proceeds.

Solely for the purpose of illustration, the invention will be shown and described as it is applied to molds for vulcanizing vehicle tires, it being understood, however, that the invention is not limited thereto, but may be embodied in such other molds as are within the scope of the subjoined claims.

Figure 1:
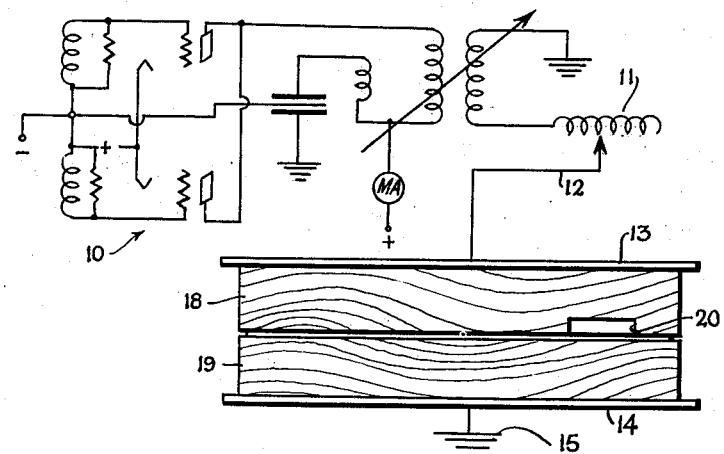
Fig. 1 is a side elevation of a vulcanizing mold embodying the invention, and a conventional radio-frequency generator operatively associated therewith for effecting high frequency dielectric heating of an article in the mold, including a pair of electrodes between which the mold is positioned.
Figure 2:
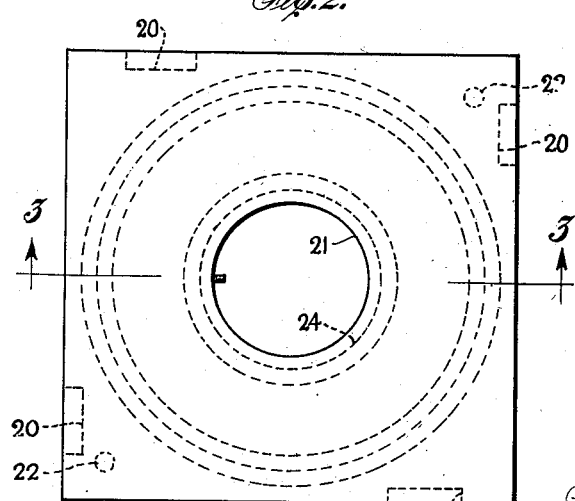
Fig. 2 is a plan view of the mold.

Referring to the drawing, there is shown in Fig. 1 a typical installation of apparatus for molding and vulcanizing an article by high-frequency dielectric heating, which process commonly is known as electronic vulcanization. Shown in said figure is a conventional, self-excited, oscillator type of radio-frequency generator designated generically by the numeral 10. This generator constitutes no part of the present invention and is of well known construction; accordingly no detail description thereof will be given, it being sufficient to point out that output power of the generator is conducted through a suitable inductance matching coil 11 and through a variable tap connector 12 to a non-grounded electrode 13. Also provided is a similar electrode 14 grounded at 15. The electrodes 13, 14 are composed of any suitable non-ferrous metal, such as aluminum or brass, and are spaced apart from each other so that the mold may be interposed therebetween.

The vulcanizing mold of the invention consists of a fabricated structure divided in its own plane into an upper section 18 and a lower section 19, which sections are substantially identical. In plan, the mold as shown is square, but it is not limited to this shape, and may be circular if expedient. In area the top and bottom surfaces of the mold are somewhat less than the area of the electrodes 13, 14, the arrangement being such that when the mold is properly positioned between the electrodes, the latter project beyond the sides of the mold as is clearly shown in Figs 1 and 3. The four sides of upper mold section 18 are formed with respective breaking slots 20 located contiguous with the parting plane of the mold, which slots enable the insertion of a prying tool to effect separation of the mold sections.

The mold is formed with a relatively large axial opening or through recess 21, and with a pair of registering dowels 22, 22 designed to facilitate accurate registry of the mold sections, as is common practice and well understood.

Figure 4:
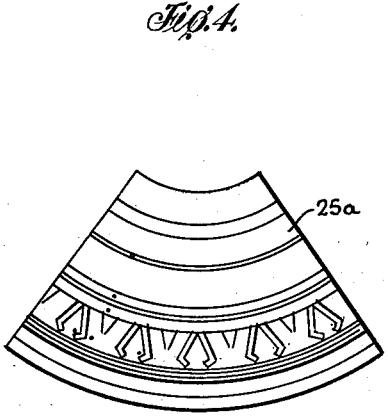
Fig. 4 is a plan view of a single unit of a segmental molding insert or matrix located within the mold structure.
Figure 3:
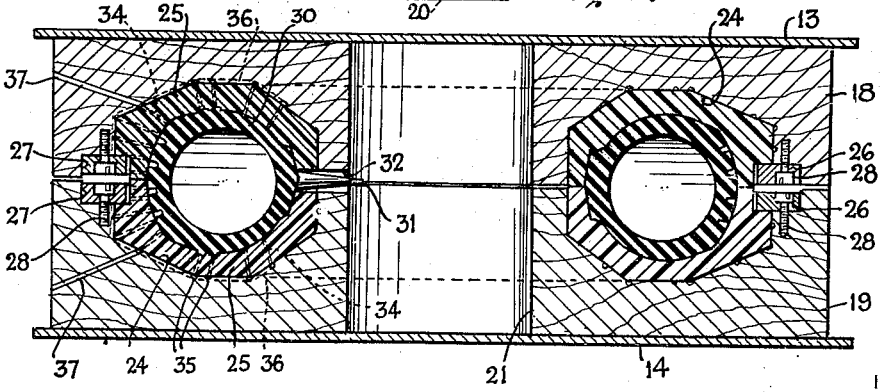
Fig. 3 is a section, on a larger scale, on the line 3—3 of Fig. 2, showing the work in the mold, and the electrodes on opposite sides of the mold.

Except for the inserts that define the molding cavity, the mold sections are composed principally of dielectric material, namely, wood. Kiln-dried maple wood has been found to be suitable for the purpose. As shown, the wood portion of each mold section is a one-piece structure, but it may be of laminated construction if desired. The mold sections 18, 19 have respective identical recesses or cavities 24 formed in the confronting faces thereof, which cavities, as shown, are annular and are concentric with the axis of the through axial opening 21. Received in each cavity 24 is a matrix 25, which matrix is composed of molded dielectric material, of which sintered multiform glass has been found to give satisfactory results. Each matrix may consist of a complete annular structure as shown in Fig. 3, or it may consist of a plurality of segments such as the segment shown at 25a, Fig. 4. The matrices are retained in the cavities 24 by respective clamping rings 26 received in suitable recesses 27 formed in the confronting faces of the wood structures of the mold and which overlie the peripheral portions of the matrices. The clamping rings 26 are retained in place by countersunk cap screws 28. The rings 26 and screws 28 are composed of any suitable non-ferrous metal such as brass or copper.

The confronting faces of the matrices 25 are concave so as together to define a complete molding cavity within which an article of thermosetting composition 30 may be molded and vulcanized. As shown, the article 30 is an annular, hollow structure such as a tubeless tire for industrial trucks and the like, and the surfaces of the matrix cavities are suitably shaped to mold the somewhat complex design on the tread portion of the tire. In cases where the article 30 is adapted to be inflated and is provided with a valve stem 31, the wood structures and matrices are suitably slotted, as shown at 32, Fig. 3, to receive such valve stem.

Molds of the character described require vents to prevent the entrapment of air between the article and the surface defining the molding cavities. To this end a plurality of circumferential series of small bores 34 are formed in the respective matrices 25, to extend from the molding cavity to the interior surface of said matrices. The surfaces of the cavities 24 of each wood structure, within which a matrix is seated, are provided with a plurality of circumferential grooves 35 connecting the outer ends of respective circumferential series of bores 34. The grooves 35 are in communication with each other through the agency of one or more transverse grooves 36, and are vented to the atmosphere through a duct or bore 37.

In operation, the article 30 is inflated sufficiently to enable it to offer at least some resistance to molding pressure. The article is then placed in the mold, after which the latter is closed and positioned between the electrodes 13, 14 symmetrically therewith as shown. Preferably the electrodes and mold are mounted between the platens of a conventional platen press (not shown) by means of which pressure may be applied to close the mold and retain it in closed condition. The electrodes, of course, are insulated from the metal platens of the press. Thereafter the radio-frequency generator 10 is energized to supply a high frequency electrical field between the electrodes 13, 14 to create molecular friction within the article 25 to heat and vulcanize the composition thereof.

The mold is of relatively simple construction, and is sufficiently rugged to withstand the heavy pressures incidental to confinement in a platen press. The use of molded glass inserts in the mold facilitates the production of molds for articles of complex or intricate pattern, and makes it possible readily to alter the mold when articles of different pattern are to be molded.

Modification may be resorted to without departing from the spirit of the invention, or the scope thereof as defined by the appended claims.

What is claimed is:

1. In a mold for electronic vulcanization, the combination of a pair of mating mold sections composed principally of wood and provided with complemental recesses in the confronting faces thereof, and matrices removably mounted in the respective recesses and constituting a lining therefor, said matrices composed of sintered glass.

2. A mold according to claim 1 in which said matrices comprise a plurality of segmental elements defining an annular cavity.

3. A mold for electronic vulcanization comprising, in combination, a pair of mold sections of dielectric material of substantial mechanical strength and capable of retaining said strength at vulcanizing temperatures, said mold sections being provided with complementary cavities defining a chamber, and a pair of complementary dielectric mold inserts formed of sintered glass particles adapted to be received and held in said chamber.

HERBERT HENRY DEIST.
FRED H. MASON.

REFERENCES CITED

The following references are of record in the file of this patent:

UNITED STATES PATENTS

| Number | Name | Date |
| --- | --- | --- |
| 587,809 | Garchey | Aug. 10, 1897 |
| 1,051,638 | Rodman | Jan. 28, 1913 |
| 1,465,545 | Demongeot | Aug. 21, 1923 |
| 1,615,474 | Midgley | Jan. 25, 1927 |
| 1,691,756 | Campbell | Nov. 13, 1928 |
| 1,834,763 | Bonsieur | Dec. 1, 1931 |
| 1,888,702 | Snyder | Nov. 22, 1932 |
| 1,916,836 | Haeuber | July 4, 1933 |
| 2,177,461 | Ruthven | Oct. 24, 1939 |
| 2,204,263 | Thoresen | June 11, 1940 |
| 2,255,238 | Willis | Sept. 9, 1941 |
| 2,330,371 | Miller | Sept. 28, 1943 |
| 2,341,617 | Hull | Feb. 15, 1944 |
| 2,421,098 | Vogt et al. | May 27, 1947 |
| 2,421,099 | Vogt | May 27, 1947 |